Sept. 28, 1965  J. B. PUTTERBAUGH ETAL  3,208,308
PUSH BUTTON SELECTION STOP MECHANISM
Filed March 5, 1964  4 Sheets-Sheet 1

INVENTORS
JAMES B. PUTTERBAUGH
JOSEPH E. WISER
BY
ATTORNEY

INVENTORS
JAMES B. PUTTERBAUGH
JOSEPH E. WISER
BY
ATTORNEY

Sept. 28, 1965   J. B. PUTTERBAUGH ETAL   3,208,308
PUSH BUTTON SELECTION STOP MECHANISM
Filed March 5, 1964   4 Sheets-Sheet 3

INVENTORS
JAMES B. PUTTERBAUGH
JOSEPH E. WISER
BY
ATTORNEY

Sept. 28, 1965  J. B. PUTTERBAUGH ETAL  3,208,308
PUSH BUTTON SELECTION STOP MECHANISM
Filed March 5, 1964  4 Sheets-Sheet 4
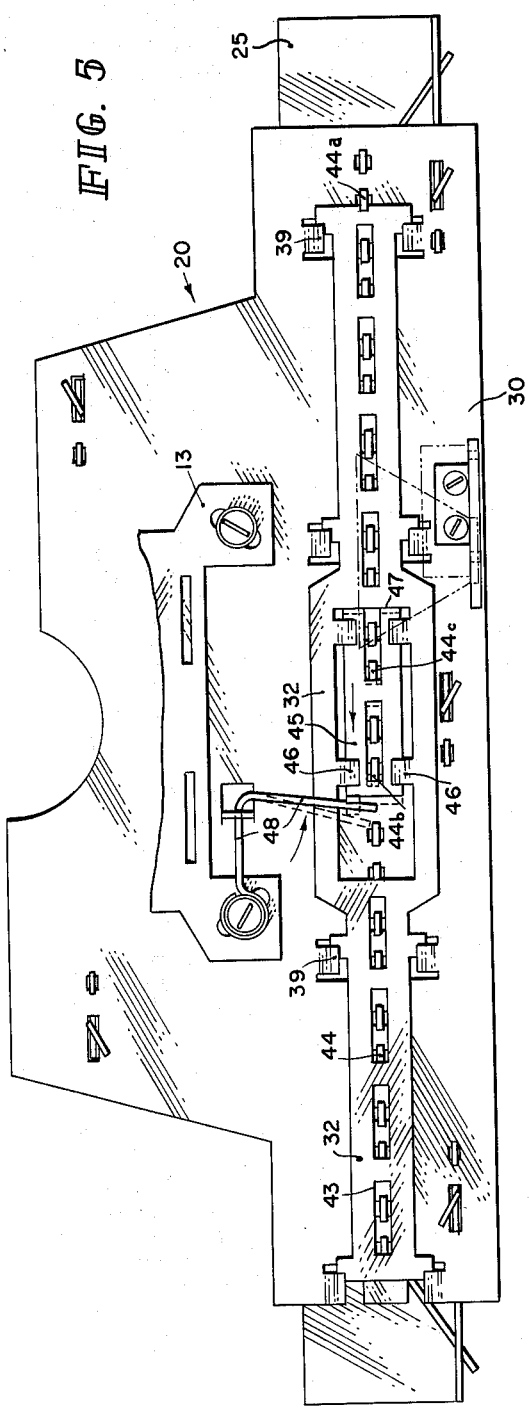
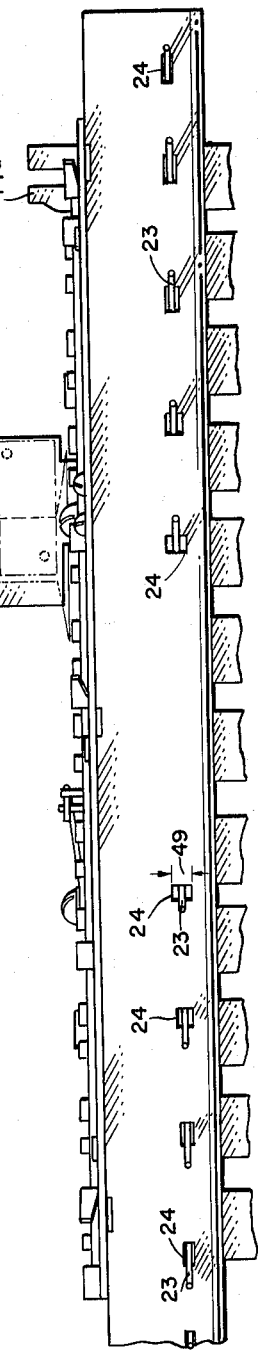
INVENTORS
JAMES B. PUTTERBAUGH
JOSEPH E. WISER
BY
ATTORNEY

United States Patent Office 3,208,308
Patented Sept. 28, 1965

3,208,308
PUSH BUTTON SELECTION STOP MECHANISM
James B. Putterbaugh and Joseph E. Wiser, Indianapolis, Ind., assignors to P. R. Mallory & Co., Inc., Indianapolis, Ind., a corporation of Delaware
Filed Mar. 5, 1964, Ser. No. 349,700
6 Claims. (Cl. 74—813)

This invention relates generally to timer or program selector switches and has particular reference to a pushbutton mechanism for accurately selecting starting points within the cycle of a timer.

In many contemporary machines featuring automatic operation, and particularly in domestic appliances, there is an ever-increasing demand for versatility of cycle programming. In the case of automatic washing machines, for example, it is customary to soak the fabric, wash with soap, and then to finally spin-dry the same in accordance with a definite program set forth in the construction of the time switch. In many cases, however, it is necessary to provide therein a multiplicity of cycle programs capable of accommodating variations in fabrics, variations in soil condition of apparel, variations in quantity of wash load, etc. With reference to only the wash cycle, for example, it is desirable to adjust the duration of that cycle to compensate for the type of fabric and the condition of apparel under treatment. This alone requires the availability of a plurality of separate programs.

Since a time switch assembly ordinarily has only one revolution or 360 degrees throughout which it may operate without cycle repetition, it therefore becomes necessary to incorporate all the required programs within that angular travel. The angular spacing between adjacent programs will obviously diminish in relation to the number of programs to be accommodated in a given machine application. Hence, the need arises for accurately distinguishing the respective starting points so that the desired cycle or cycles may be established without error. To accomplish this end, an expedient method is to predetermine particular starting points in the cycle of operation so that the elapsed time of operation may be varied in accordance with the nature of the fabric being treated.

Accordingly, in the present invention there is disclosed a means for accurately and conveniently selecting various starting points within the cycle of a timer.

It is an object of the present invention, therefore, to provide a pushbutton mechanism of unique construction for accurately selecting starting points within the cycle of a timer.

It is another object of the present invention to provide a pushbutton mechanism for establishing starting points on a timer wherein the desired functional characteristics are obtained with a minimum number of parts.

Still another object of the present invention is to provide a starting point establishing means for a timer wherein the actuating mechanism is simple, efficient, reliable, and economical.

The present invention, in another of its aspects, relates to novel features of the instrumentalities described herein for teaching the principal object of the invention, and to the novel principles employed in the instrumentalities whether or not these features and principles may be used in the said object and/or in the said field.

Other objects of the present invention and the nature thereof will become apparent from the following description considered in connection with the accompanying figures of the drawing wherein like reference characters describe elements of similar function therein, and wherein the scope of the invention is determined rather from the dependent claims.

In the drawings:
FIGURE 1 is a perspective view of an electromechanical timer employing the selective stop mechanism of the present invention.

FIGURE 5 is a rear view of the selective stop mechanism illustrating the function of the main and secondary latching bars.

FIGURE 6 is a fragmentary bottom view of the selective stop mechanism of the present invention.

Figure 1:
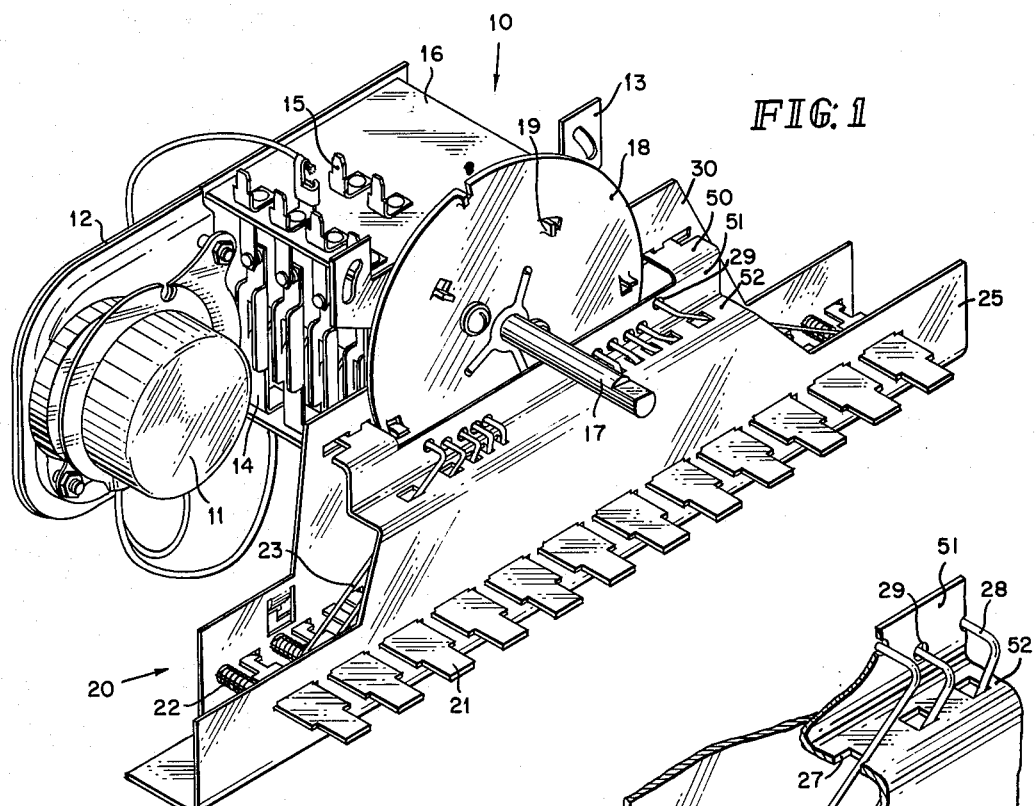

Generally speaking, the present invention provides a mechanism for selecting a plurality of starting points within the cycle of an electromechanical timer. Numerous pushbuttons therein are adapted to deflect discrete stop members so as to create an interference condition with corresponding lugs which project from an index plate attached to the main timer shaft. Upon depression of a selected pushbutton, the timer shaft is pulled axially outward by the operator, and thereupon rotated until the stop position is reached. The timer shaft is then pushed axially inward and rotation of the timer mechanism commences under its own motive power.

There is thus shown and described in the figures, a timer having a rotating shaft 17 upon which are mounted a plurality of switch activating members. A selective stop mechanism comprising an indexing member 18 is rotated by said shaft 17, said member having a plurality of stop lugs 19, struck out therefrom. A plate 30 is placed at the rear of said indexing member for attaching said mechanism to said timer. Means are provided on said plate 30 for holding a movable latching bar 32 thereagainst. A front plate having stepped portions is connected to said rear plate 30 of said mechanism, said front plate including a horizontal portion 50 joined to said rear portion. A front vertical portion 51 is integrally joined thereto: said vertical portion having apertures 29 therein with a horizontal portion 52 joined to the first vertical portion 51. A second vertical portion 25 depends from said horizontal portion 52 and is turned back horizontally to be connected to said vertical portion 25. Pushbutton means are held by said rear plate 30 and said second vertical portion 25. A plurality of wires 23 are connected to said pushbuttons and to the apertures 29 in the first vertical portion 51; said wires having end portions adapted to pass through said apertures 29 so as to meet the struck out portions 19 and to retain said indexing member at points determined by said individual pushbuttons.

Referring now to FIGURE 1 of the drawing, a typical electromechanical timer switch assembly is indicated generally by reference numeral 10. Included in switch assembly 10 are the conventional components such as drive motor 11, rear mounting plate 12, front mounting plate 13, and a plurality of cam-actuated switches, the latter being shown typically at 14. Terminal posts 15 are affixed to top cover 16 for electrical connections on the timer.

Main shaft 17 serves as the central axis of switch assembly 10, and a plurality of program cams are affixed thereto. Rigidly attached to shaft 17 is index plate 18, a circular member of metal or other suitable material. Projecting from the forward or outer surface of index plate 18 is a plurality of stop lugs, illustrated typically by reference numeral 19.

With continued reference FIGURE 1, the selective stop mechanism of the present invention is indicated generally by reference numeral 20. Mechanism 20 is affixed to switch assembly 10 by means of attaching screws, not visible in FIGURE 1, which engage front plate 13. Disposed along the forward or outer face of mechanism 20 is a plurality of depressable pushbuttons, indicated typically by reference numeral 21. In the illustrated embodiment, twelve pushbuttons are provided, ten of which are adapted to select cycle starting points. To each push button 21 is affixed a coil spring 22 which causes return of a depressed button upon selection of a new button. Responsive to depression of the respective pushbuttons are individual selector wires, shown typically at 23.

Figure 2:
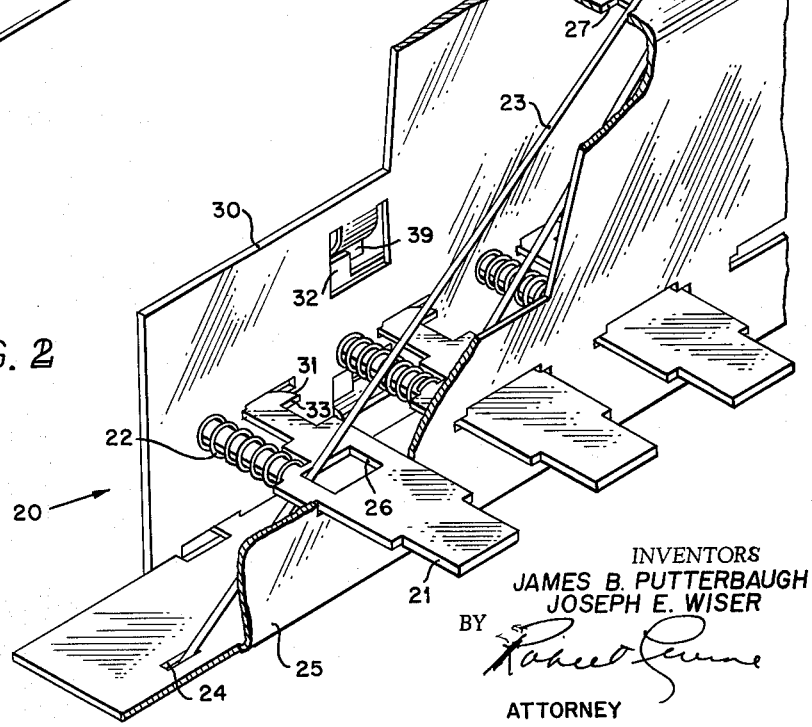
FIGURE 2 is a fragmentary perspective view, partially cut away, showing the pushbutton linkage of the present invention.

FIGURE 2 provides a more detailed view of the pushbutton linkage of mechanism 20. Each selector wire 23 is restrained at its lower end by an aperture 24 formed in the lower horizontal section of frame member 25. It will hereinafter be shown that the geometry of respective apertures 24 is intentionally varied for the individual pushbuttons in order to compensate for the length variations in wire 23, thereby maintaining a substantially constant depression force. Wire 23 extends angularly upward through actuating slot 26 formed in pushbutton 21. Maximum travel of wire 23 is controlled by stop slot 27 formed in an upper horizontal section of frame member 25. The geometry of the respective stop slots is intentionally varied. The upper end of wire 23 forms a right angle bend 28 which permits piloting of the wire extremity within hole 29.

With continued reference to FIGURE 2 of the drawing, pushbutton 21 is constructed with two dependencies on the inner side thereof, both of which are adapted to pass through attaching plate 30. One of said dependencies serves to locate and guide coil spring 22. The other dependency contains a ramped section 31 which is adapted to transversely displace latching bar 32 for eventual locking of a selected pushbutton in the depressed position. Locking surface 33, which is adjacent to ramped section 31, is adapted to penetrate an aperture in latching bar 32, and to engage a corner thereof, thus creating the aforementioned locking action. Upon selection of another pushbutton, latching bar 32 is again displaced in a transverse direction, thus permitting release of the previously-depressed button and causing subsequent locking of the newly-depressed button. Latching bar 32 is guided in its transverse travel by means of a plurality of tabs, indicated typically by reference numeral 39. Tab 39 is lanced out of attaching plate 30 and is suitably contoured to retain latching bar 32.

Figure 3:
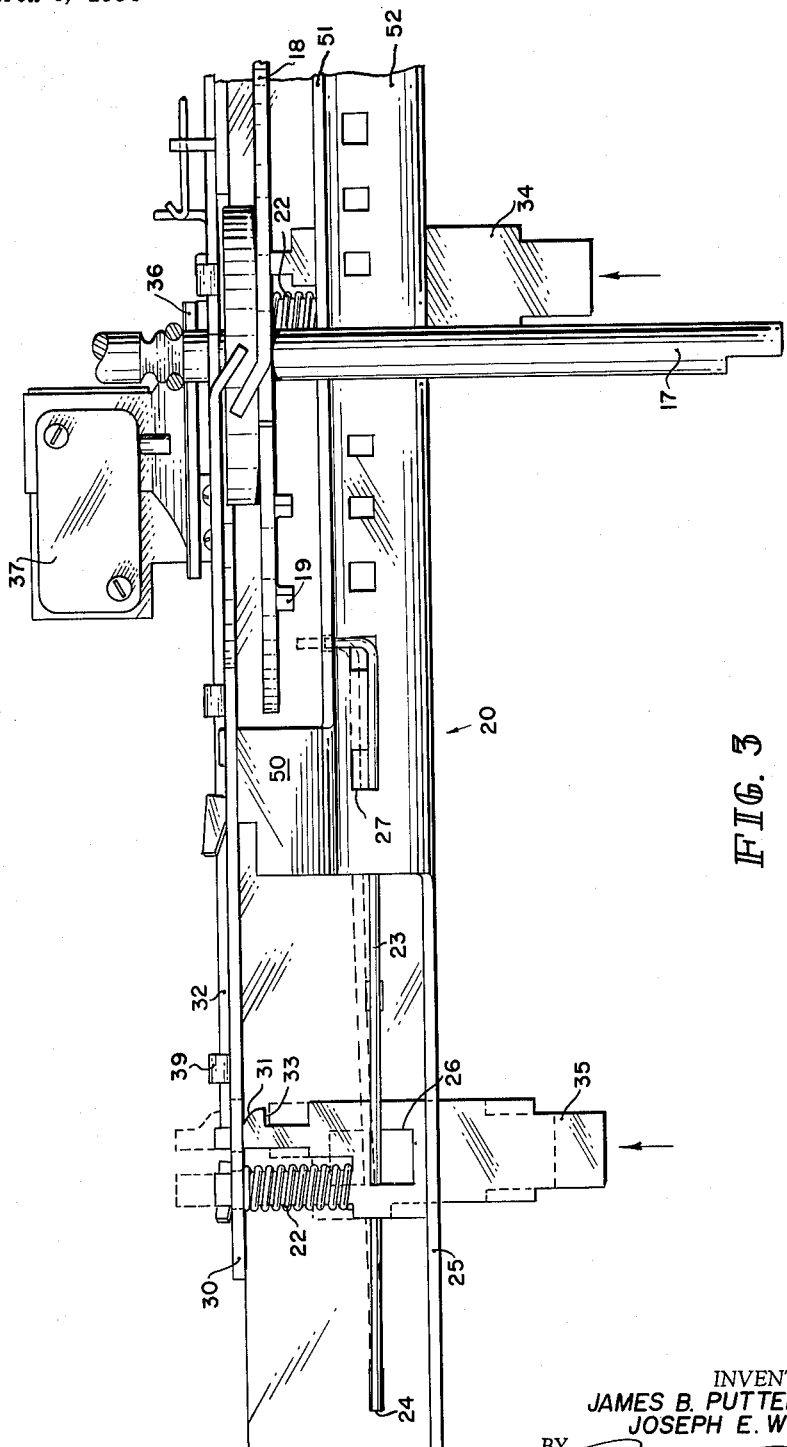
FIGURE 3 is a fragmentary top view of the selective stop mechanism wherein the effect of pushbutton depression is illustrated.

Referring now to FIGURE 3 of the drawing, the top side of mechanism 20 is seen in fragmentary view. For reasons of clarity, only two pushbuttons are illustrated in this view, these being identified by reference numerals 34 and 35, respectively. When pushbutton 35 is in the extended position, as indicated by the solid lines, selector wire 23 is located against one edge of stop slot 27. Upon depression of pushbutton 35 in the direction of the arrow, however, the related parts assume a new position as illustrated by the dotted lines. Ramped section 31 of the pushbutton penetrates attaching plate 30 such that locking surface 33 overlaps the corner of latching bar 32.

Pushbutton 34, as illustrated in FIGURE 3, is adapted to deflect actuating plate 36, which, in turn, energizes switch 37 for some desired program function. This pushbutton, therefore, is not concerned with the starting point establishing mechanism.

Figure 4:
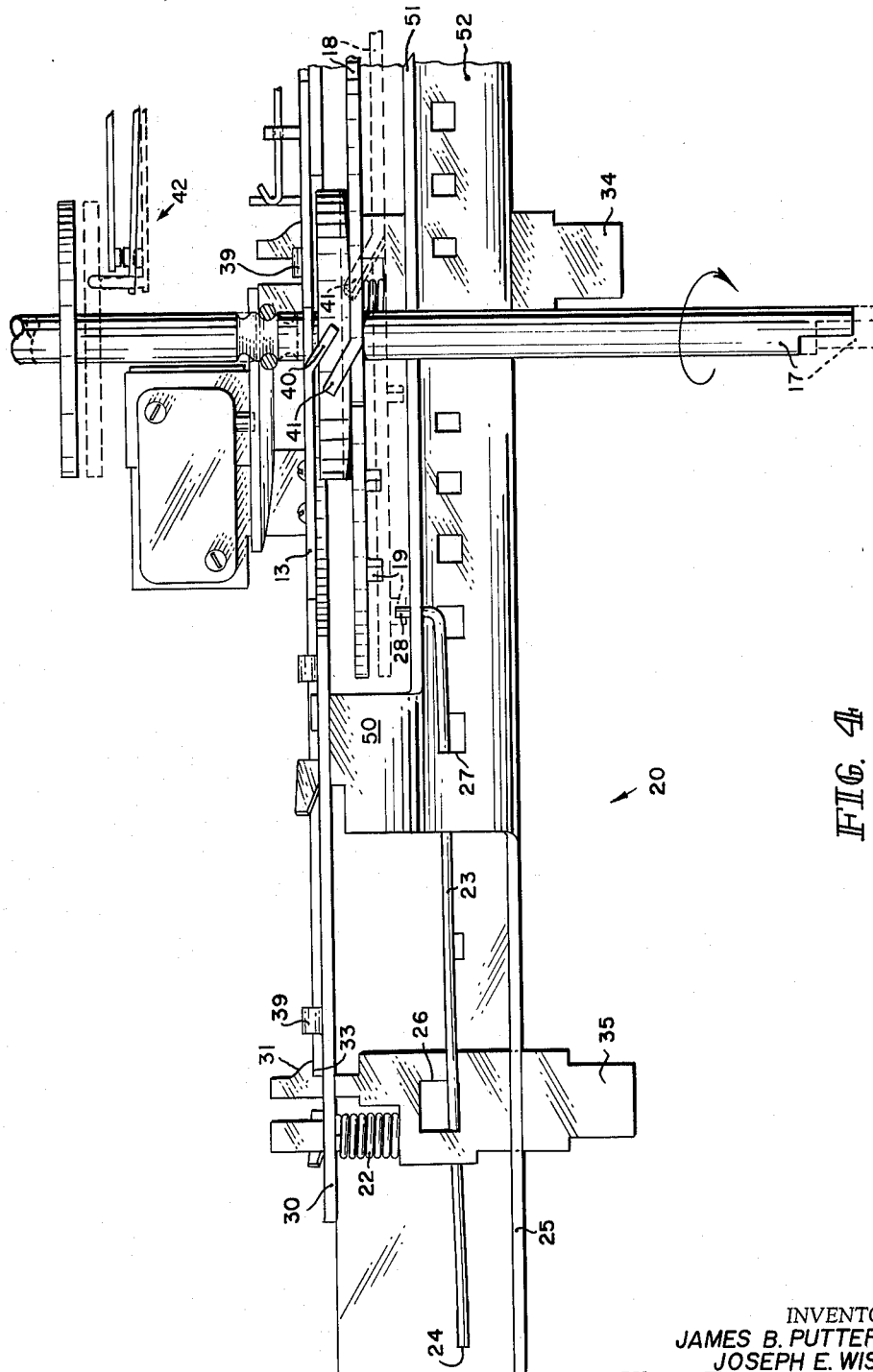
FIGURE 4 is a fragmentary top view of the selective stop mechanism illustrating the interference action created by axial and rotational movement of the timer shaft while a pushbutton is depressed.

Referring now to FIGURE 4, bushbutton 35 is seen in the depressed postion. Because index plate 18 is in the axially-inward position, lug 19 cannot create an interference path with the tip 38 of selector wire 23. However, when shaft 17 is moved axially outward, the related parts assume the position indicated by the dotted lines.

To start the desired program, the timer shaft 17, is manually indexed out by the operator pulling the shaft out and then rotating said shaft 17 in a clockwise direction. Should the operator fail to index the shaft 17 out axially, upon rotation of shaft 17 in a clockwise direction ramping tang 40, located on front mounting plate 13 and ramping tang 41 integral with indexing plate 18, make contact. Upon further clockwise rotation of shaft 17 tangs 40 and 41 are forced apart as indicated by the dotted lines. With continued manual rotation of shaft 17, stop lug 19 creates an interference with pre-selected tip 28 also shown in dotted lines. Shaft 17 is then manually indexed in, thereby closing line switch 42, so as to activate timer motor 11 to run the timer through its pre-programmed cycle until indexing plate 18 is again in the location illustrated by the solid lines. At this point in time, the timer motor 11 is de-energized by means of a program cam located in the timer switch, thereby completing the cycle.

FIGURE 5 is a back view of timer mechanism 20. Located on plate 30 and held by tabs 39 with freedom to slide therein, is main latching bar 32. A plurality of apertures, generally shown at 43 are located in main latching bar 32 to allow passage of pushbutton dependency 44 to operate said slide bar 32 in a reciprocating manner.

When a first pushbutton with dependency 44A located thereon has been pushed causing the main latching bar 32 to hold it in a depressed position, then one of the center pushbuttons having dependencies 44B and 44C respectively, is allowed to operate a secondary latching bar 45. Because secondary latching bar 45 is held by tangs 46 located on the main latching bar 32 with freedom to slide therein, the two center pushbuttons can be selected, or cancelled out by each other without releasing any pre-selected pushbutton held by the main latching bar 32. However, if any one of the pushbuttons is depressed to operate main latching bar 32, all of the pushbuttons in both latching bars will be released due to the abutment of portion 47 on main latching bar 32 against the secondary latching bar 45. Also illustrated in FIGURE 5 is a wire spring 48 which exerts a continuous spring force in the direction of the arrow.

FIGURE 6 is a bottom view of stop mechanism 20. It is noted that all the spring wires 23 are of different lengths due to the individual relationship of the respective pushbutton to the indexing plate 18. Therefore, means must be devised to equalize the amount of pressure between a pushbutton located in the center of the mechanism 20 in relation to the pushbuttons on the end portions thereof. This has been overcome by allowing the spring wire 23 operated by one of the pushbuttons in the center to travel free for a short distance in aperture 24 before movement is restrained thereby. This dimension shown at 49 is reduced as the length of the spring wires 23 is increased, thus equalizing the amount of pressure required to operate any of the pushbuttons by the operator.

The present invention of a pushbutton selective stop mechanism is merely illustrative and not exhaustive in scope and since many widely different embodiments of the invention may be made without departing from the scope thereof, it is intended that all matter contained in the above description and shown in the accompanying drawings shall be interpreted as illustrative and not in a limiting sense.

We claim:

1. In a timer having a rotating shaft upon which are mounted a plurality of switch activating members; a selective stop mechanism comprising an indexing member coupled to and rotated by said shaft, said member having a plurality of stop lugs projecting therefrom, a plate placed at the rear of said indexing member, means on said plate for holding a movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal portion joined to the first vertical portion, a second vertical portion depending from said second horizontal portion, and a turned back horizontal portion connected to said second vertical portion, pushbutton means held by said rear plate and said second vertical portion, and a plurality of wires connected to said pushbuttons and to the apertures in the first vertical portion, said wires having end portions passing through said apertures so as to meet the said lugs so as to restrain said indexing member at points determined by said individual pushbuttons.

2. In a timer having a rotating shaft upon which are mounted a plurality of switch activating members; a selective stop mechanism comprising a disc coupled to and rotated by said shaft, said disc having a plurality of stop lugs projecting therefrom, a plate placed at the rear of said indexing member, tab means on said plate for holding a laterally movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal portion having slots therein joined to the first vertical portion, a second vertical portion depending from said second horizontal portion, and a turned back horizontal portion connected to said second vertical portion, pushbutton means held by said rear plate and second vertical portion, and a plurality of wires connected to said pushbuttons and to the apertures in the first vertical portion, said wires passing through said slots and having end portions passing through said apertures so as to meet the stop lug and to restrain said indexing member at points determined by said individual pushbuttons.

3. In a timer having a rotating shaft upon which are mounted a plurality of switch activating members; a selective stop mechanism comprising an indexing member coupled to and rotated by said shaft, said member having a plurality of stop lugs projecting therefrom, a plate placed at the rear of said indexing member, means on said plate holding a movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal portion joined to the first vertical portion, and having different sized slots therein, a second vertical portion depending from said second horizontal portion, and a turned back horizontal portion connected to said second vertical portion, pushbutton means held by said rear plate and said second vertical portion activating said latching bar for individually holding respective buttons, a plurality of wires connected to said pushbuttons and to the apertures in the first vertical portion, passing through said slots, said wires having end portions passing through said apertures so as to meet said lugs and to restrain said indexing member at a point determined by said individual pushbuttons.

4. In a timer having a rotating shaft upon which are mounted a plurality of switch activating members; a selective stop mechanism comprising an indexing member coupled to and rotated by said shaft, said member having a plurality of stop lugs projecting therefrom, a plate placed at the rear of said indexing member, means on said plate for holding a movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal slotted portion joined to the first vertical portion, a second vertical portion depending from said second horizontal portion, and a turned back horizontal portion having slots connected to said second vertical portion, slotted pushbutton means held by said rear plate and said second vertical portion, a plurality of wires passing through said slots of said pushbuttons, said slots of said turned back portion, said slots of said vertical portion and through the apertures in the first vertical portion, said wires having end portions passing through said apertures thereof so as to meet said lugs and to restrain said indexing member at a point determined by said individual pushbuttons.

5. In a timer having a rotating shaft upon which are mounted a plurality of switch activating members; a selective stop mechanism comprising a indexing member coupled to and rotated by said shaft, said member having a plurality of stop means, a plate placed at the rear of said indexing member, means on said plate for holding a movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal portion joined to the first vertical portion, a second vertical portion depending from said second horizontal portion, and a turned back horizontal portion connected to said second vertical portion, pushbutton means held by said rear plate and said second vertical portion, and a plurality of wires connected to said pushbuttons and to the apertures in the first vertical portion, said wires having end portions passing through said apertures to cooperatively coact with said stop means to restrain said indexing member at points determined by said individual pushbuttons.

6. In a timer having a rotating shaft upon which are mounted a plurality of switch activating members; a selective stop mechanism comprising an indexing member coupled to and rotated by said shaft, said member having a plurality of stop means, a plate placed at the rear of said indexing members, means on said plate for holding a movable latching bar thereagainst, a front plate having stepped portions connected to said rear plate of said mechanism, said front plate including a horizontal portion joined to said rear plate, a front vertical portion integrally joined thereto, said vertical portion having apertures therein, a second horizontal portion having a plurality of slots of varying lengths joined to the first vertical portion, a second vertical portion depending from said second horizontal portion, and a turned back horizontal portion connected to said second vertical portion, said turned back portion having a plurality of slots, pushbutton means having slots individually cut therethrough, held by said rear plate and said second vertical portion, a plurality of wires angularly connected to said pushbuttons and to the apertures in the first vertical portion, said wires passing through said slots in said turned back portion and said horizontal portion and having end portions adapted to pass through said apertures to engage said stop means to restrain said indexing member at a point determined by said individual pushbuttons.

References Cited by the Examiner
UNITED STATES PATENTS 2,973,672　3/61　Thornbery _____ 74—813
3,074,282　1/63　Beck et al. _____ 74—3.52

MILTON KAUFMAN, *Primary Examiner.*